United States Patent
Zhang et al.

(10) Patent No.: US 10,408,342 B2
(45) Date of Patent: Sep. 10, 2019

(54) TRANSMISSION CONTROL TO AVOID GAIN SWITCH DURING SHIFT

(71) Applicant: Ford Global Technologies, LLC, Dearborn, MI (US)

(72) Inventors: Jianping Zhang, Ann Arbor, MI (US); Jaewon Choi, Northville, MI (US); Kendrick Morrison, Wayne, MI (US); Stephen Michael Cicala, Dearborn Heights, MI (US); Cory Benson LaRoche, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 15/726,988

(22) Filed: Oct. 6, 2017

(65) Prior Publication Data

US 2018/0119803 A1    May 3, 2018

Related U.S. Application Data

(60) Provisional application No. 62/414,348, filed on Oct. 28, 2016.

(51) Int. Cl.
| | |
|---|---|
| *F16H 61/06* | (2006.01) |
| *B60W 30/19* | (2012.01) |
| *B60W 10/115* | (2012.01) |
| *B60W 50/00* | (2006.01) |
| *F16H 59/14* | (2006.01) |

(52) U.S. Cl.
CPC ......... *F16H 61/061* (2013.01); *B60W 10/115* (2013.01); *B60W 30/19* (2013.01); *B60W 2050/0008* (2013.01); *F16H 2059/147* (2013.01)

(58) Field of Classification Search
CPC . F16H 61/061; F16H 2059/147; B60W 30/19
See application file for complete search history.

(56) References Cited

U.S. PATENT DOCUMENTS

| | | | |
|---|---|---|---|
| 7,056,263 B2 | 6/2006 | Whitton | |
| 8,246,514 B2 | 8/2012 | Hayashi | |
| 8,744,705 B2 | 6/2014 | Thor | |
| 2008/0081735 A1* | 4/2008 | Runde | B60W 10/06 477/107 |
| 2012/0010046 A1* | 1/2012 | Yacoub | F16H 61/061 477/86 |
| 2013/0026401 A1* | 1/2013 | Burkhart | F16H 61/0251 251/129.15 |
| 2016/0339921 A1* | 11/2016 | Takahashi | F16H 61/143 |

* cited by examiner

*Primary Examiner* — Stacey A Fluhart
(74) *Attorney, Agent, or Firm* — David Kelley; Brooks Kushman P.C.

(57) ABSTRACT

In a transmission hydraulic control system, a gain control valve may be used to switch between a low gain and a high gain based on line pressure. Line pressure may be controlled as a function of turbine torque. If the gain of a holding element or oncoming element changes during a shift as a result of changing turbine torque, shift quality may degrade. If the gain is set low at the beginning of the shift, the controller limits engine torque to ensure that the line pressure is not increased beyond a level that would cause a gain switch. If the gain is set high at the beginning of a shift, the controller maintains the line pressure high enough to prevent a switch to low gain, even if turbine torque drops.

4 Claims, 8 Drawing Sheets

FIG. 8

TRANSMISSION CONTROL TO AVOID GAIN SWITCH DURING SHIFT

CROSS-REFERENCE TO RELATED APPLICATIONS

This application claims the benefit of U.S. provisional application Ser. No. 62/414,348 filed Oct. 28, 2016, the disclosure of which is hereby incorporated in its entirety by reference herein.

TECHNICAL FIELD

This disclosure relates to the field of control systems for automatic transmissions for motor vehicles. Specifically, the disclosure relates to control of a transmission in which clutch gain varies dependent on line pressure.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Discrete ratio transmissions are capable of transmitting power via various power flow paths, each associated with a different speed ratio. A particular power flow path is established by engaging particular shift elements, such as clutches or brakes. Shifting from one gear ratio to another involves changing which shift elements are engaged. In many transmissions, the torque capacity of each shift element is controlled by routing fluid to the shift elements at controlled pressure. A controller adjusts the pressure by sending electrical signals to a valve body.

In addition to controlling the torque capacity of the shift elements, the valve body provides fluid for other purposes. These include providing fluid for lubrication and providing fluid to a torque converter. The fluid absorbs heat that is generated by friction within the transmission. Typically, the fluid is pressurized and circulated by an engine driven pump.

SUMMARY OF THE DISCLOSURE

A transmission includes a plurality of hydraulically controlled shift elements, a valve body, and a controller. The valve body is configured to route fluid at controlled pressure from a line pressure circuit to the shift elements. The valve body includes a gain control valve configured to alter a relationship between a commanded current and a resulting shift element torque capacity in response to a pressure in the line pressure circuit exceeding a switching threshold. Between shifts, the controller is programmed to set the pressure in the line pressure circuit as a function of a turbine torque. During a shift, if the turbine torque is less than the threshold at the beginning of the shift, the controller limits an engine torque level throughout the shift such that the gain control valve does not change state. If the turbine torque exceeds a threshold at a beginning of the shift, the controller may maintain the pressure in the line pressure circuit above the switching threshold throughout the shift. The gain control valve may adjust the gain of a shift element that is an oncoming element for the shift or is a holding element for the shift.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
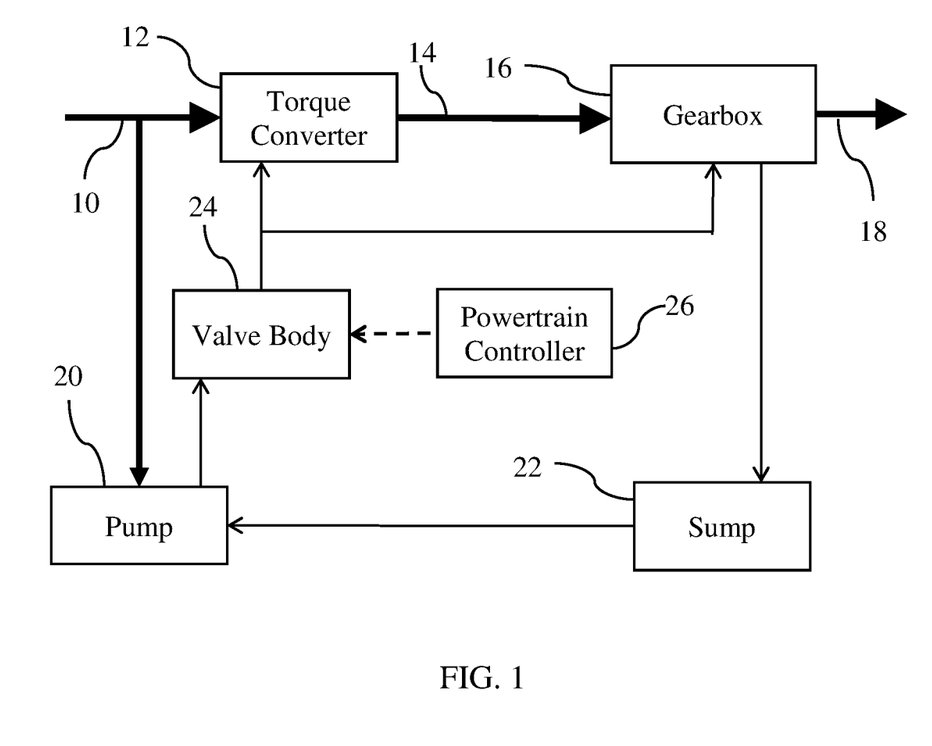
FIG. 1 is a schematic diagram of a transmission system.

FIG. 1 schematically illustrates a vehicle transmission. Bold solid lines represent mechanical power flow connections. Thin solid lines represent the flow of hydraulic fluid. Dashed lined represent the flow of information signals. Power is supplied at input shaft 10, generally from an internal combustion engine crankshaft. Fluid coupling 12 includes an impeller driveably connected to input shaft 10 and a turbine driveably connected to turbine shaft 14. Power is transmitted from the impeller to the turbine via moving fluid whenever the impeller rotates faster than the turbine. Fluid coupling 12 may be a torque converter which also includes a stator which redirects the fluid when the impeller is rotating substantially faster than the impeller such that the turbine torque is a multiple of the impeller torque. Gearbox 16 includes gearing and shift elements configured to establish various power flow paths between turbine shaft 14 and output shaft 18. Each power flow path may be established by engaging an associated subset of the shift elements. At low vehicle speed, a power flow path providing torque multiplication and speed reduction between the turbine shaft and the output shaft may be established to optimize vehicle performance. At higher vehicle speeds, a power flow path providing speed multiplication may be established to minimize fuel consumption.

The shift elements within gearbox 16 are engaged by supplying hydraulic fluid at an elevated pressure to a clutch apply chamber. Each shift element may include a clutch pack having friction plates splined to one component interleaved with separator plates splined to a different component. The fluid forces a piston to squeeze the clutch pack such that frictional force between the friction plates and the separator plates couples the components. The torque capacity of each shift element varies in proportion to changes in the fluid pressure. Pump 20, driven by input shaft 10, draws fluid from sump 22 and delivers it at an elevated pressure to valve body 24. Valve body 24 delivers the fluid to the clutch apply chambers at a pressure controlled in accordance with signals from powertrain controller 26. In addition to the fluid provided to clutch apply chambers, valve body provides fluid for lubrication and provides fluid to torque converter 12. The fluid eventually drains from gearbox 18 back to sump 22 at ambient pressure.

Figure 2:
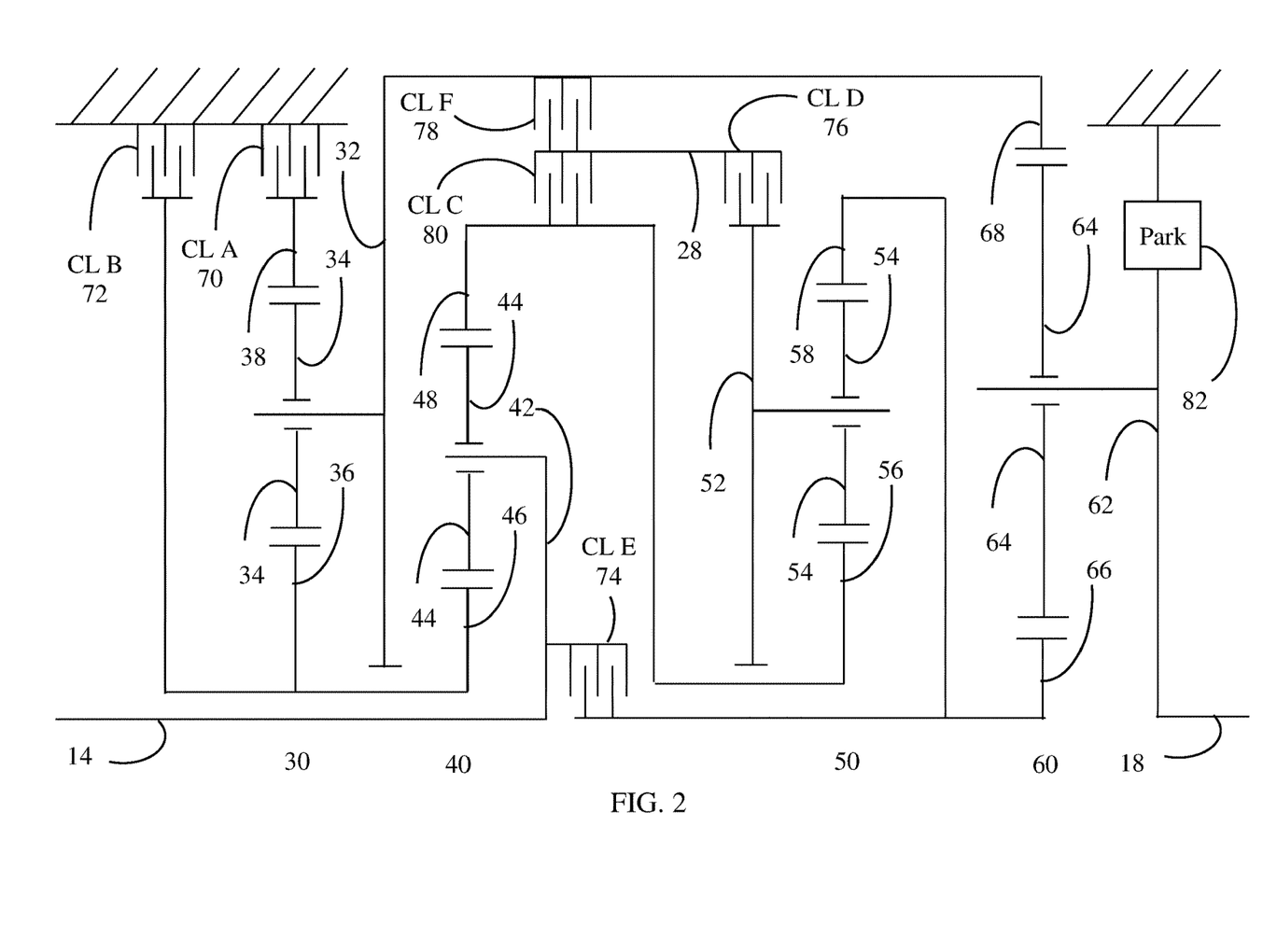
FIG. 2 is a schematic diagram of a transmission gearing arrangement suitable for the gearbox of the transmission system of FIG. 1.

An example transmission is schematically illustrated in FIG. 2. The transmission utilizes four simple planetary gear sets 30, 40, 50, and 60. Sun gear 36 is fixedly coupled to sun gear 46, carrier 32 is fixedly couple to ring gear 68, ring gear 48 is fixedly coupled to sun gear 56, ring gear 58 is fixedly coupled to sun gear 66, turbine shaft 14 is fixedly coupled to carrier 42, and output shaft 18 is fixedly coupled to carrier 62. Ring gear 38 is selectively held against rotation by brake 70 and sun gears 36 and 46 are selectively held against rotation by brake 72. Turbine shaft 14 is selectively coupled to ring gear 58 and sun gear 66 by clutch 74. Intermediate shaft 28 is selectively coupled to carrier 52 by clutch 76, selectively coupled to carrier 32 and ring gear 68 by clutch 78, and selectively coupled to ring gear 48 and sun gear 56 by clutch 80. A suggested ratio of gear teeth for each planetary gear set is listed in Table 1.

TABLE 1

| | |
|---|---|
| Ring 38/Sun 36 | 2.20 |
| Ring 48/Sun 46 | 1.75 |
| Ring 58/Sun 56 | 1.60 |
| Ring 68/Sun 66 | 3.70 |

As shown in Table 2, engaging the clutches and brakes in combinations of four establishes ten forward speed ratios and one reverse speed ratio between turbine shaft 14 and output shaft 18. An X indicates that the clutch is required to establish the speed ratio. An (X) indicates the clutch can be applied but is not required to establish the power flow path. In $1^{st}$ gear, either clutch 78 or clutch 80 can be applied instead of applying clutch 76 without changing the speed ratio. When the gear sets have tooth numbers as indicated in Table 1, the speed ratios have the values indicated in Table 2.

TABLE 2

| | A 70 | B 72 | C 80 | D 76 | E 74 | F 78 | Ratio | Step |
|---|---|---|---|---|---|---|---|---|
| Rev | X | X | | X | | X | −4.79 | 102% |
| Park | X | X | X | | | | | |
| $1^{st}$ | X | X | | (X) | X | | 4.70 | |
| $2^{nd}$ | X | X | X | X | | | 2.99 | 1.57 |
| $3^{rd}$ | X | | X | X | X | | 2.18 | 1.37 |
| $4^{th}$ | X | | X | X | | X | 1.80 | 1.21 |
| $5^{th}$ | X | | X | | X | X | 1.54 | 1.17 |
| $6^{th}$ | X | | | X | X | X | 1.29 | 1.19 |
| $7^{th}$ | | | X | X | X | X | 1.00 | 1.29 |
| $8^{th}$ | | X | | X | X | X | 0.85 | 1.17 |
| $9^{th}$ | | X | X | | X | X | 0.69 | 1.24 |
| $10^{th}$ | | X | X | X | | X | 0.64 | 1.08 |

Figure 3:
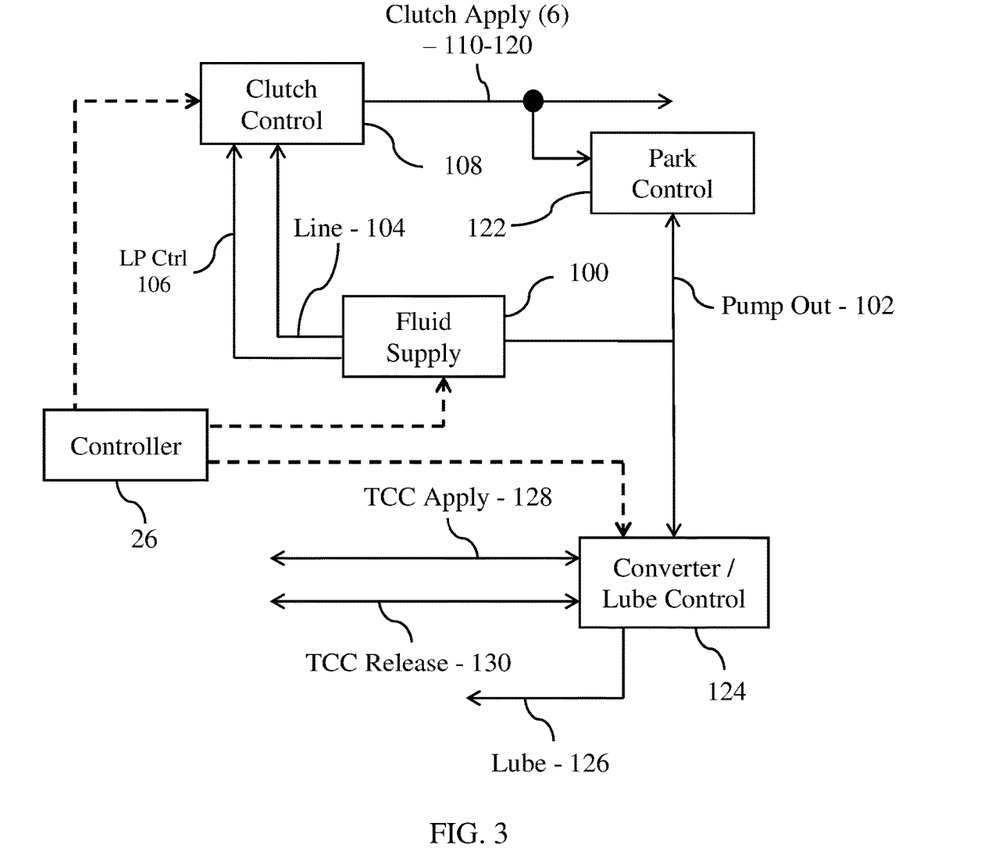
FIG. 3 is a high level schematic diagram of a hydraulic control system suitable for use with the transmission system of FIG. 1.

Parking pawl 82 selectively couples output shaft 18 to the transmission case to prevent vehicle movement when the vehicle is parked. Unlike shift elements 70-80, parking pawl 82 is designed to remain engaged without any external power once engaged. As illustrated in Table 2, shift elements 70, 72, and 80 may be engaged when the transmission is in Park. This combination does not establish a power flow path between turbine shaft 14 and output shaft 18. However, having several clutches already applied decreases the number of clutch engagements required to transition into reverse or 1st gear. Other combinations of three or fewer shift elements would also provide this benefit FIG. 3 schematically illustrates a hydraulic control system suitable for the transmission of FIG. 1 with the gearing arrangement of FIG. 2. Solid lines represent the flow of fluid and dashed lines represent information signals. A collection of fluid passageways connected to transport fluid such that the pressure is substantially equal at various locations within the collection may be called a hydraulic circuit. Slight variation in pressure within a hydraulic circuit may occur due to parasitic viscous drag of flowing fluid. A hydraulic circuits may be connected to another hydraulic circuit by an orifice that permits some fluid flow between the circuits but intentionally limits the flow rate and creates an intentional pressure differential when flow occurs. Hydraulic circuits may also be connected to one another by valves. A valve may block flow between the circuits in some circumstances, permit free flow with negligible pressure drop in other circumstances, and permit limited flow with intentional pressure drop in yet other circumstances.

Fluid supply subsystem 100 provides fluid at elevated pressure in three circuits: a pump output circuit 102, a line pressure circuit 104, and an LP Ctrl circuit 106. The pressure in these circuits varies in response to control signals from controller 26. Pump output circuit 102 and line pressure circuit 104 are designed to accommodate high fluid flow rates with minimal parasitic pressure drop. Clutch control subsystem 108 regulates the pressure in six clutch apply circuits, 110 through 120 to a pressure less than line pressure in response to signals from controller 26. Each of the six clutch apply circuits routes fluid to the apply chamber of one of the six shift elements of FIG. 2 respectively. Park control subsystem 122 mechanically engages and disengages parking pawl 82 in response to variations in the pressures in the clutch apply circuits. Converter/lube control subsystem 124 regulates the pressure and flow in a lubrication circuit 126, a torque converter clutch apply circuit 128, and a torque converter clutch release circuit 130. The structure and operation of each of these subsystems is discussed in more detail below.

Figure 4:
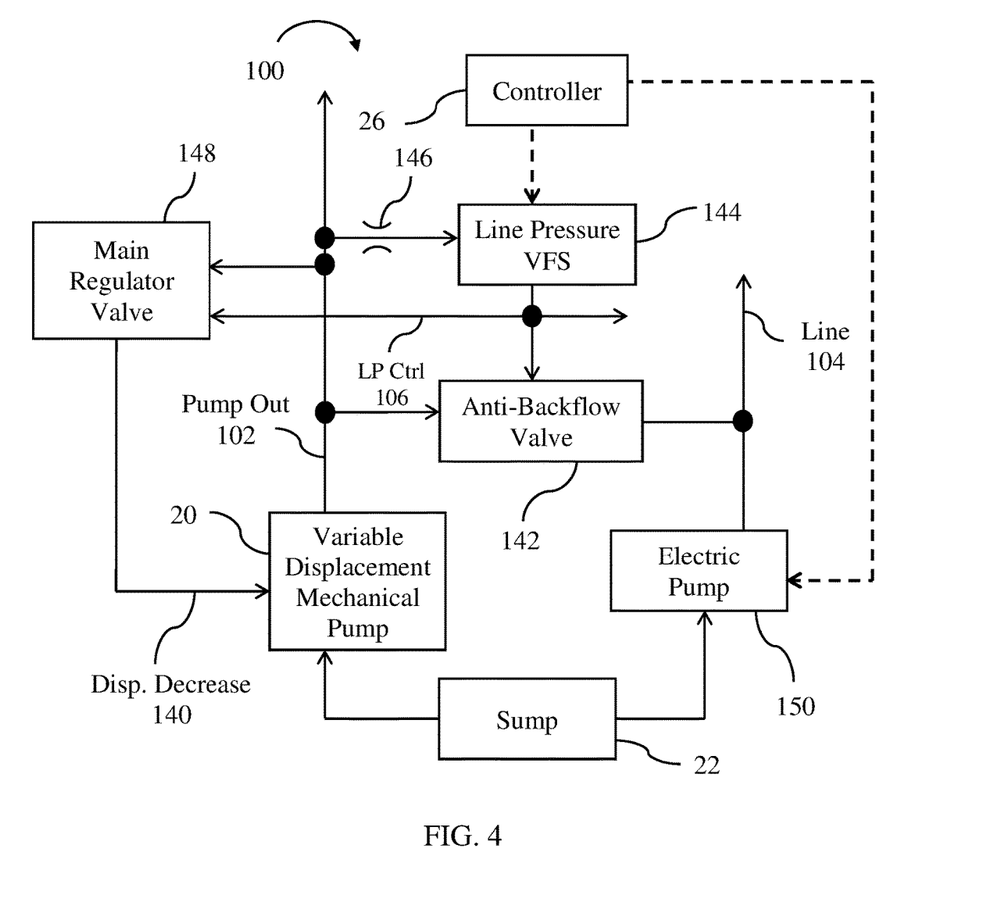
FIG. 4 is a schematic diagram of a fluid supply subsystem of the hydraulic control system of FIG. 3.

FIG. 4 schematically illustrates the fluid supply subsystem 100. Similar fluid supply subsystems are discussed in U.S. Patent Application Publications 2013/0014498 and 2013/0017112 which are incorporated by reference in their entirety herein. Pump 20, which is driven by the transmission input shaft, draws fluid from sump 22 and delivers the fluid to pump output circuit 102. Pump 20 is a positive displacement pump. Disregarding leakage, positive displacement pumps deliver a certain amount of fluid per revolution of the pump shaft regardless of the relative pressure at the pump inlet and pump outlet. The torque required to rotate the pump shaft increases as the pressure at the pump outlet increases relative to the pressure at the inlet. The amount of fluid delivered per revolution is called the pump displacement. The displacement of pump 20 varies within predefined limits based on the pressure in displacement decrease circuit 140.

During normal operation, anti-backflow valve 142 is open such that fluid flows freely from the pump outlet circuit 102 to the line pressure circuit 104 and the pressure in the two circuits is substantially equal. The controller adjust the pressure in these two circuits by sending a command to line pressure Variable Force Solenoid (VFS) 144. Fluid flows from the pump out circuit 102, through an orifice 146, through a valve opening in line pressure VFS 144 and then into LP Ctrl circuit 106. The pressure drop from the pump output circuit 102 to the LP Ctrl circuit 106 varies depending upon the size of the opening in line pressure VFS 144. The size of the opening in line pressure VFS 144 varies based on movement of a spool. Electrical current from controller 26 creates a magnetic force on the spool tending to enlarge the opening. Fluid in the LP Ctrl circuit 106 acts on an area of the spool to create a force tending to reduce the size of the opening. An equilibrium is reached at which the pressure in the LP Ctrl circuit 106 is proportional to the electrical current.

Main regulator valve 148 adjusts the displacement of pump 20 in order to maintain the pressure in pump out circuit 102 proportional to the pressure in the LP Ctrl circuit 106. Pressure in the LP Ctrl circuit 106 generates a force on a spool in main regulator valve 148. Pressure in the pump out circuit 102 generates a force on the spool valve in the opposite direction. When the pressure in the pump out circuit 102 exceeds the pressure in the LP Ctrl circuit, the spool moves to allow flow from pump out circuit 102 to displacement decrease circuit 140. Pressure in circuit 140 causes a reduction in the flow rate from pump 20 into the pump out circuit 102. Components fed by the pump out circuit 102 and the line pressure circuit 104 establish a relationship between the pressure in these circuits and the flow rate. Consequently, the reduction in flow rate results in a reduction in the pressure in pump out circuit 102 until an equilibrium is reached.

When the vehicle is stopped, such as when waiting at a traffic light, powertrain controller 26 may shut off the engine to conserve fuel. When the driver again demands torque by releasing the brake and depressing the accelerator pedal, the controller restarts the engine. In order to respond quickly after the engine is restarted, it is important to maintain some clutches in an engaged state. Fluid flow to maintain these clutches is provided by electrically driven pump 150 which directly feeds line pressure circuit 104. During engine shutdown periods, controller 26 adjusts the pressure in line pressure circuit 104 by controlling the speed of the electric motor driving pump 150. Controller 26 stops supplying current to line pressure VFS 144 causing the pressure in LP Ctrl circuit 106 to drop to ambient pressure. In response to this reduction in LP Ctrl pressure, anti-backflow valve 142 closes to prevent flow from line pressure circuit 104 to pump out circuit 102. Therefore, when the engine is shut down, the pressure in pump out circuit 102 drops to ambient pressure.

Figure 5:
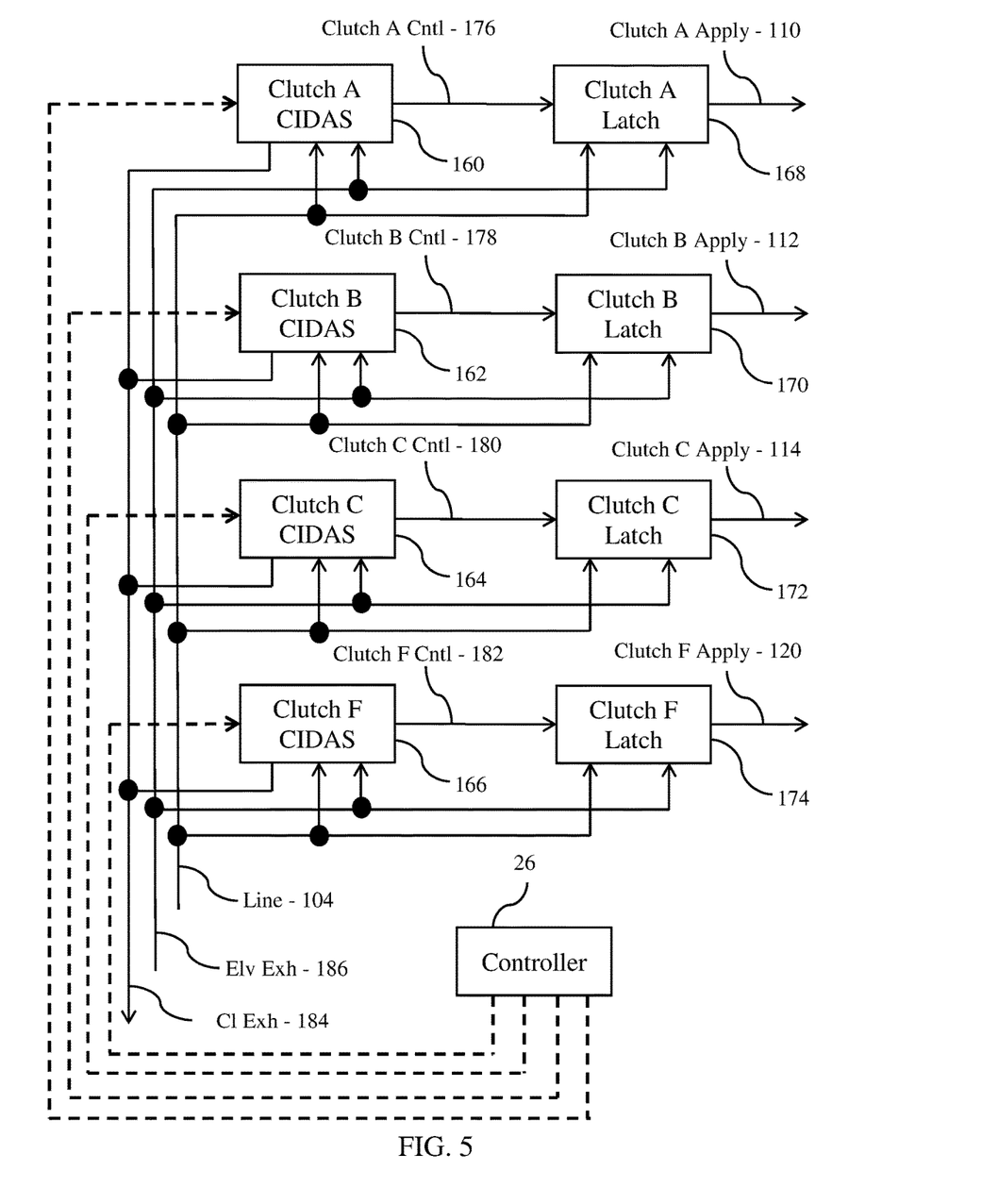
FIG. 5 is a schematic diagram of a first portion of a clutch control subsystem of the hydraulic control system of FIG. 3 suitable for use to control four of the shift elements of the gearing arrangement of FIG. 2.
Figure 6:
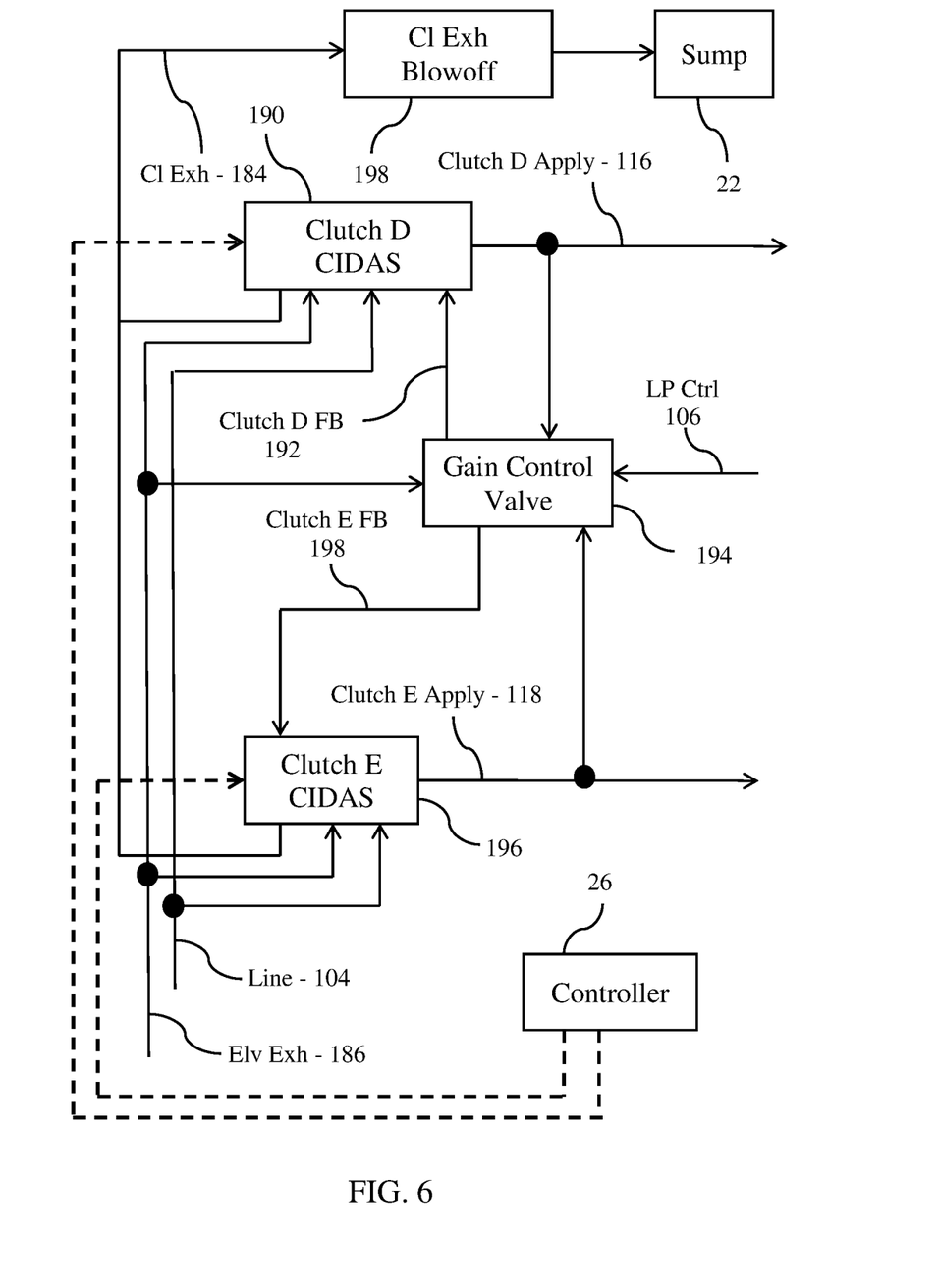
FIG. 6 is a schematic diagram of a second portion of a clutch control subsystem of the hydraulic control system of FIG. 3 suitable for use to control two of the shift elements of the gearing arrangement of FIG. 2.

FIGS. 5 and 6 schematically illustrate the clutch control subsystem 108. Controller 26 adjusts the torque capacity of each clutch by adjusting an electrical current to a corresponding solenoid. During a shift, accurate control of the torque capacity of the on-coming and off-going clutches is very important. The relationship between changes in the electrical current and changes in torque capacity is called the gain. If the gain is too high, then accuracy of torque capacity control suffers. The torque capacity of engaged clutches while in a fixed gear or holding clutches during a shift must be maintained higher than the transmitted torque in order to avoid clutch slip. Sometimes, these requirements are in tension with one another. For example, in reverse, the torque capacity of brake A must be maintained at more than three and a half times the gearbox input torque. In $6^{th}$ gear, on the other hand, the torque transmitted by brake A is less than 30% of the gearbox input torque. Brake A is the off-going element in a shift from $6^{th}$ gear to $7^{th}$ gear. During this shift, which may occur at relatively low gearbox input torque, a low gain is required. However, this same low gain would not be suitable in reverse gear at relatively high gearbox input torque.

FIG. 5 illustrates the components that control four of the six shift elements of the gearing arrangement of FIG. 2, CL A 70, CL B 72, CL C 80, and CL F 78. Each clutch apply circuit is controlled by the combination of a Casting-Integrated Direct-Acting Solenoid (CIDAS) 160, 162, 164, or 166 and a corresponding latch valve 168, 170, 172, or 174. Each CIDAS controls the pressure in a corresponding controlled pressure circuit 176, 178, 180, or 182 in response to a control signal from controller 26. Each latch valve connects a clutch apply circuit to a corresponding controlled pressure circuit when the pressure in the controlled pressure circuit is below a threshold and connects the clutch apply circuit to line pressure circuit 104 when the controlled pressure is above the threshold. This arrangement enables use of a low gain during shift events and yet provides high torque capacity at other times. The thresholds and gains may vary among the various clutches. When a controlled pressure is commanded to zero, the CIDAS valve connects the controlled pressure circuit to clutch exhaust circuit 184 which provides a path for fluid to escape from the clutch apply chamber to de-stroke the clutch piston. Elevated exhaust circuit 186 provides a supply of fluid at very near ambient pressure. The structure and operation of a CIDAS/latch valve combination is described in detail in U.S. Patent Application Publication 2013/0026401 which is incorporated by reference in its entirety herein.

FIG. 6 illustrates the components that control the other two of the six shift elements of the gearing arrangement of FIG. 2, CL D 76 and CL E 74. Fluid flows from line pressure circuit 104, through an opening in Clutch D CIDAS 190 into Clutch D apply circuit 116. The size of the opening varies depending upon the position of a spool in CIDAS 190. An electrical signal from controller 26 creates a magnetic force pushing the spool in one direction tending to increase the size of the opening. Fluid in the clutch D apply circuit 116 acts on an area of the spool tending to push the spool in the opposite direction and reduce the size of the opening. Additionally, fluid in the clutch D feedback circuit 192 acts on a second area also tending to reduce the size of the opening. The pressure drop between the line pressure circuit and the clutch D apply circuit is related to the size of the opening. An equilibrium is reached at which the pressure in the clutch D apply circuit is proportional to the electrical current. The coefficient of proportionality, or gain, is determined by gain control valve 194. When the pressure in the LP Ctrl circuit 106 is above a threshold, gain control valve 194 connects the clutch D feedback circuit 192 to the elevated exhaust circuit 186. In this condition, the gain is relatively high because the pressure in the clutch D apply circuit acts only on the first area of the spool. When the pressure in the LP Ctrl circuit 106 is below the threshold, gain control valve 194 connects the clutch D feedback circuit 192 to the clutch D apply circuit 116. In this condition, the gain is relatively low because the pressure in the clutch D apply circuit acts only on both the first and second areas of the spool. Similarly, clutch E CIDAS 196 and gain control valve 194 cooperatively control the pressure in clutch E apply circuit with two different gains. The structure and operation of a combination of valves 190, 194, and 196 is described in detail in U.S. Patent Application Publication 2014/0182693 which is incorporated by reference in its entirety herein. Blowoff valve 198 exhausts the clutch exhaust circuit 184 from all six clutches to the sump, maintaining a slight positive pressure such that the circuit does not become evacuated.

Figure 7:
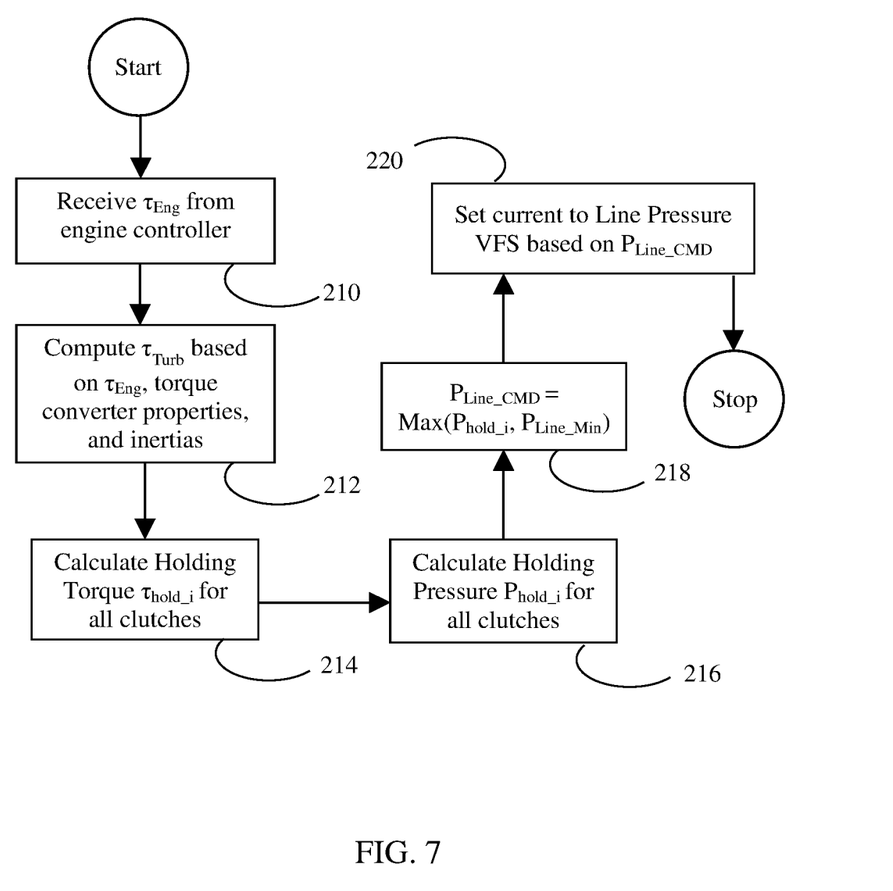
FIG. 7 is a flow chart for controlling transmission line pressure.

FIG. 7 illustrates an exemplary process for controlling line pressure. This process is executed at regular intervals, such as in response to an interrupt that occurs every 100 ms. At 210, the transmission controller receives an estimate of the current engine torque output from the engine controller. At 212, the controller estimates the current turbine torque based on the engine torque, the state of the torque converter lockup clutch, measured speeds of the torque converter turbine and impeller (or engine), known torque converter characteristics (K factors, etc.), elements inertias, measured acceleration rates, etc. At 214, the controller calculates the torque transmitted by each of the six clutches. (For purposes of this discussion, no distinction is made between clutches and brakes.) For each gear ratio, the ratio of clutch torque to turbine torque is determined in advance based on the kinematic arrangement and the number of teeth on each gear. (The exact torque can vary slightly from this ratio due to clutch drag and element inertia.) For disengaged clutches, the ratio is zero. During the torque phase of a shift, the ratio gradually changes from the initial ratio to the final ratio. For simplicity, the greater of the two ratios may be selected. During the inertia phase of a shift, the ratio of the higher numbered gear applies (the destination gear for an upshift and the initial gear for a downshift).

At 216, the controller determines the pressure required for the torque capacity of each clutch to equal the clutch torque. The pressure and the torque capacity are related by a different transfer function for each clutch. The transfer function is predominantly determined by physical properties of the clutch, such as piston area, but may also vary based on noise factors that influence friction coefficient or other parameters. The control strategy may adapt the transfer function in response to measured responses during events such as shifts to account for these noises. At 218, the commanded line pressure is calculated by taking the maximum of the six clutch pressures and a minimum line pressure. The minimum line pressure ensures that, at low turbine torque, the line pressure is not set too low for some of the other functions such as torque converter feed, lubrication, etc. At 220, the transmission controller sets the current to the Line Pressure VFS to command the required line pressure with some margin.

If the engine torque varies during a shift event, the line pressure will also vary during the shift event. As discussed with regard to FIG. 6, a variation in the line pressure can result in the gain for the D and E clutches changing. If either of these clutches is an off-going clutch or an oncoming clutch for the shift, the change in gain will cause the clutch torque to diverge from the intended clutch torque, causing a rough shift. As shown in Table 2, these two clutches are involved in many shifts. Even when one of these clutches is held throughout the shift, the changing gain may cause a torque disturbance. Therefore, it is desirable to avoid gain switching during a shift event.

Figure 8:
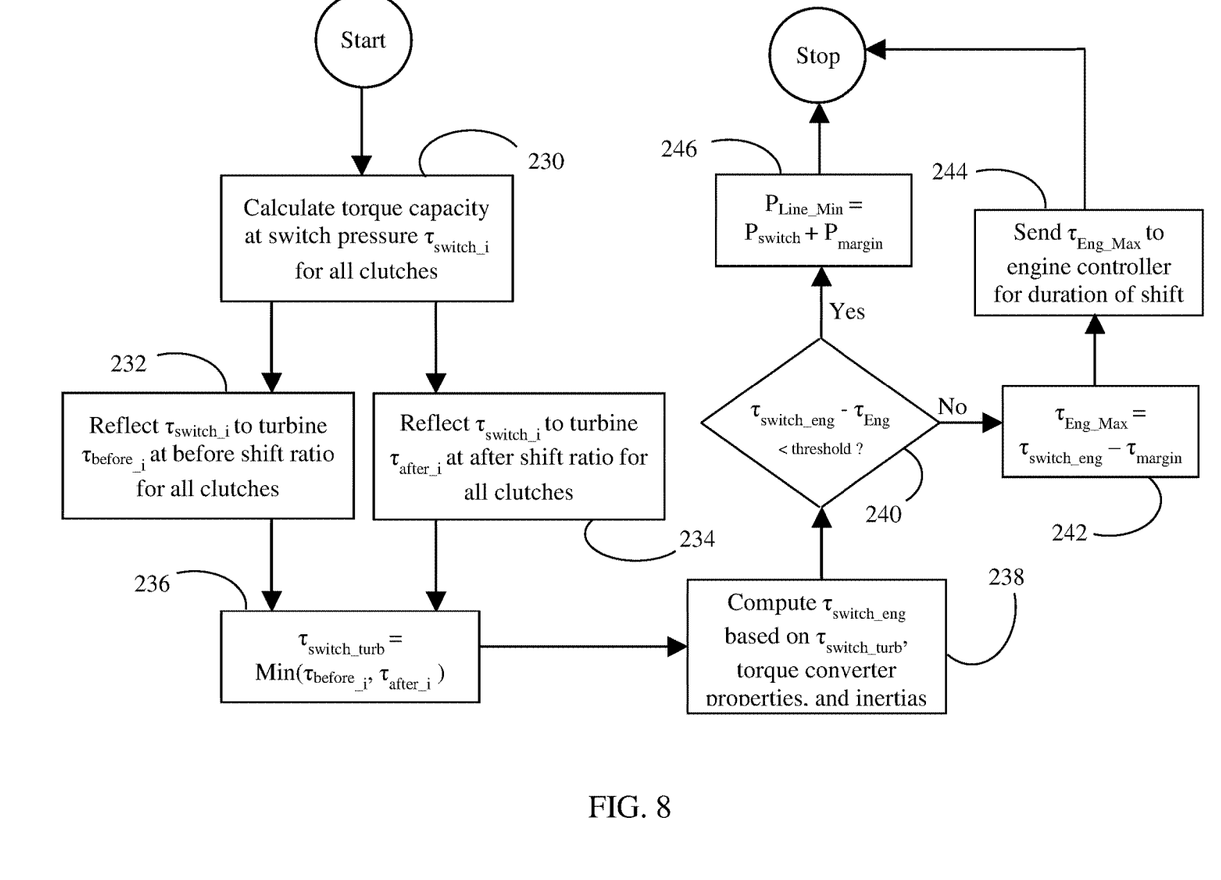
FIG. 8 is a flow chart for calculating the maximum engine torque to avoid a gain switch during a shift.

FIG. 8 illustrates a method of preventing a gain switch during a shift. This process is executed in response to a shift being scheduled, prior to executing the shift. At 230, the controller calculates the torque capacity each of the six clutches would have if they were supplied with pressure equal to the line pressure at which the gain switches. These values are computed using the transfer functions for each clutch, which may have been adapted to account for recently observed behavior. At 232 and 234, these torque values are reflected to the turbine shaft by dividing by the ratios for the initial gear and the destination gear respectively. For the oncoming clutch, the ratio for the initial gear is zero. Similarly, for the off-going clutch, the ratio for the destination gear is zero. At 236, the turbine torque corresponding to the gain switch is calculated by taking the minimum of these values. At 238, the controller calculates the engine torque corresponding to the turbine torque calculated at 236. This is essentially the inverse of the calculation performed at 212 of FIG. 7. An iterative calculation method may be required.

Depending on how the current engine torque compares to the calculated engine torque for a gain switch, the controller either ensures that the low gain is maintained throughout the shift or that the low gain is maintained throughout the shift. At 240, if the current engine torque is less than the switching torque by more than a threshold, the method proceeds to 242. At 242, a maximum engine torque is calculated that will ensure that the engine torque stays less than the gain switching torque. This value is communicated to the engine controller at 244. As long as the engine controller prevents the engine torque from exceeding this level, the line pressure calculated by the method of FIG. 7 will keep the gain at the low level. After the shift completes, the maximum engine torque is reset to its previous value. If, at 240, the current engine torque exceeds or is within a threshold of the switching torque, the method proceeds to 246. At 246, the minimum line pressure is set to the switching pressure plus a margin. This ensures that the line pressure command calculated at 218 of FIG. 7 is always high enough to select the high gain. After the shift, the minimum line pressure is returned to its previous value.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A powertrain control method comprising:
   between shifts, setting a line pressure as a function of a turbine torque wherein the turbine torque exceeding a threshold results in a line pressure that triggers a gain control valve to increase a shift element gain; and
   in response to the turbine torque being less than the threshold at a beginning of a shift, limiting an engine torque throughout the shift to maintain the turbine torque below the threshold.

2. The powertrain control method of claim 1 further comprising:
   in response to the turbine torque being greater than the threshold at the beginning of the shift, maintaining the line pressure high enough throughout the shift to maintain the gain control valve at the increased shift element gain level.

3. The powertrain control method of claim 1 wherein the shift element gain is associated with a shift element that is in an engaged state throughout the shift.

4. The powertrain control method of claim 1 wherein the shift element gain is associated with an oncoming shift element for the shift.

* * * * *